(12) United States Patent
Ooishi et al.

(10) Patent No.: US 9,903,219 B2
(45) Date of Patent: Feb. 27, 2018

(54) STEAM GOVERNING VALVE APPARATUS AND POWER GENERATION FACILITY

(71) Applicant: KABUSHIKI KAISHA TOSHIBA, Minato-Ku (JP)

(72) Inventors: Tsutomu Ooishi, Yokohama (JP); Shinji Watanabe, Yokohama (JP)

(73) Assignee: KABUSHIKI KAISHA TOSHIBA, Minato-Ku (JP)

( * ) Notice: Subject to any disclaimer, the term of this patent is extended or adjusted under 35 U.S.C. 154(b) by 0 days.

(21) Appl. No.: 15/024,432

(22) PCT Filed: Sep. 24, 2014

(86) PCT No.: PCT/JP2014/075245
§ 371 (c)(1),
(2) Date: Mar. 24, 2016

(87) PCT Pub. No.: WO2015/046226
PCT Pub. Date: Apr. 2, 2015

(65) Prior Publication Data
US 2016/0208636 A1 Jul. 21, 2016

(30) Foreign Application Priority Data
Sep. 24, 2013 (JP) .................... 2013-196849

(51) Int. Cl.
*F16K 47/00* (2006.01)
*F01D 17/10* (2006.01)
(Continued)

(52) U.S. Cl.
CPC ............... *F01D 17/10* (2013.01); *F16K 1/12* (2013.01); *F16K 1/36* (2013.01); *F16K 1/38* (2013.01); *F16K 47/04* (2013.01); *F05D 2220/31* (2013.01)

(58) Field of Classification Search
CPC ... F16K 47/02; F16K 1/38; F16K 1/36; F16K 47/04; F05D 2220/31; F01D 17/10
See application file for complete search history.

(56) References Cited

U.S. PATENT DOCUMENTS

| 209,290 A | * | 10/1878 | Pierce | .................... F16K 47/02 |
| | | | | 251/120 |
| 2,289,239 A | | 7/1942 | Bryant et al. | |

(Continued)

FOREIGN PATENT DOCUMENTS

| JP | 56-136103 U | 10/1981 |
| JP | 61-151009 U | 9/1986 |

(Continued)

OTHER PUBLICATIONS

International Search Report dated Dec. 16, 2014 for PCT/JP2014/075245 filed on Sep. 24, 2014.

(Continued)

*Primary Examiner* — Umashankar Venkatesan
(74) *Attorney, Agent, or Firm* — Oblon, McClelland, Maier & Neustadt, L.L.P.

(57) ABSTRACT

With a simple structure in which the component count is reduced, the occurrence of noise and vibrations can be prevented in a range from a minute opening degree to the vicinity of an intermediate opening degree, and a pressure loss can be decreased when an opening degree is a fully-open opening degree or the vicinity thereof and thus the efficiency of a steam turbine can be improved. A steam governing valve apparatus includes: a valve main body 30 in which a valve chest 31 to which steam is supplied is formed; a valve seat 32 in which a spherical curved surface is formed at a position facing the valve chest 31 that is provided in the valve main body 30; a valve element 34 that is housed in the valve chest 31 and on which a spherical curved surface is formed; and a valve rod 33 that is provided on an upstream (Continued)

side relative to the valve element 34 and that drives so that the respective spherical curved surfaces of the valve seat 32 and the valve element 34 contact/separate to set a valve opening degree; in which a bottom portion of the valve element 34 includes a protruding portion 35 that protrudes from a middle position thereof to the valve seat 32 side, and an edge 36 that is formed at a rim so that a recessed portion 37 is formed around the protruding portion 35.

9 Claims, 15 Drawing Sheets

(51) Int. Cl.
*F16K 1/38* (2006.01)
*F16K 47/04* (2006.01)
*F16K 1/12* (2006.01)
*F16K 1/36* (2006.01)

(56) References Cited

U.S. PATENT DOCUMENTS

| | | | | |
|---|---|---|---|---|
| 3,415,427 A | * | 12/1968 | Sharp | B22D 41/16 222/591 |
| 3,857,542 A | * | 12/1974 | Heymann | F01D 17/145 137/625.33 |
| 5,533,548 A | * | 7/1996 | Grant | F16K 17/0466 137/540 |
| 6,494,229 B2 | * | 12/2002 | Kajitani | F16K 1/38 137/530 |
| 7,931,252 B2 | * | 4/2011 | Shindo | F16K 1/34 251/318 |
| 8,020,383 B2 | * | 9/2011 | Ooishi | F01D 17/10 137/613 |
| 8,042,570 B2 | * | 10/2011 | Shindo | F01D 1/00 137/613 |
| 9,416,678 B2 | * | 8/2016 | Hamada | F01D 17/145 |
| 2007/0235670 A1 | * | 10/2007 | Shindo | F16K 1/34 251/121 |

FOREIGN PATENT DOCUMENTS

| | | |
|---|---|---|
| JP | 2006-63957 A | 3/2006 |
| JP | 2008-175267 A | 7/2008 |
| JP | 2009-250146 A | 10/2009 |

OTHER PUBLICATIONS

English translation of International Preliminary Report on Patentability and Written Opinion of the International Searching Authority dated Apr. 7, 2016 in PCT/JP2014/075245.

* cited by examiner

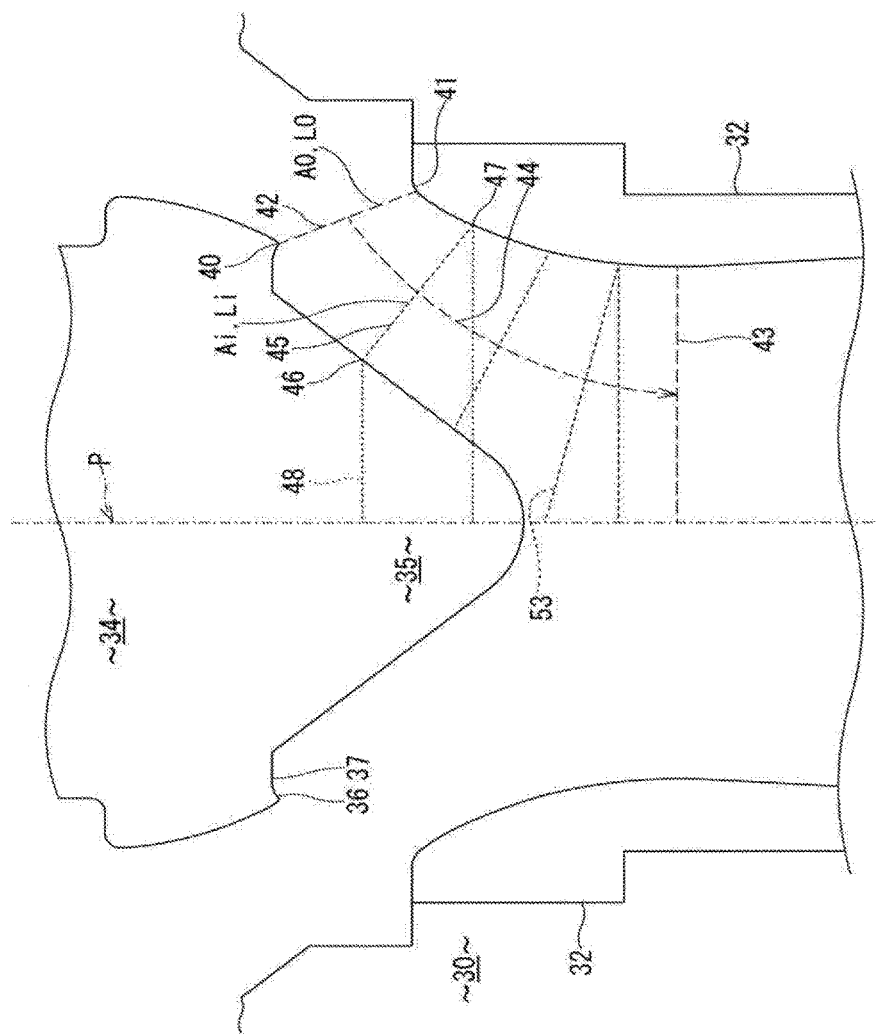

STEAM GOVERNING VALVE APPARATUS AND POWER GENERATION FACILITY

TECHNICAL FIELD

Embodiments of the present invention relate to a steam governing valve apparatus that controls an amount of steam that flows into a steam turbine, and to a power generation facility equipped with the steam governing valve apparatus.

BACKGROUND ART

Generally, steam turbines used in power generation facilities such as thermal power plants and nuclear power plants are provided with a steam governing valve apparatus on an upstream side of the steam turbine for controlling the steam flow rate according to load changes and for cutting off the supply of steam in response to an emergency. The steam governing valve apparatus that is arranged upstream of the high-pressure turbine is disposed in series with a main stop valve.

FIG. 14 is an explanatory drawing that illustrates a conventional steam governing valve apparatus that is used in a steam turbine. In FIG. 14, a main stop valve 110 that instantly stops steam from flowing into the steam turbine in response to an emergency or the like with respect to the steam turbine, and a steam governing valve 120 for controlling a steam flow rate are shown. A side portion of a valve main body 121 of the steam governing valve 120 communicates with and is connected to the main stop valve 110. The steam governing valve apparatus has a top cover 122 on an upper end portion of the valve main body 121. A valve seat 123 that forms a raised shape is provided in an inner portion of the valve main body 121, and a valve rod 125 that is coupled to a valve element 124 that butts against the valve seat 123 penetrates through the top cover 122 and is connected to an oil cylinder 127.

A steam flow from an unshown boiler or the like flows into the main stop valve 110 as indicated by an arrow I, and flows out from the steam governing valve 120 as indicated by an arrow O. When hydraulic pressure acts on the oil cylinder 127 of the steam governing valve 120, the valve element 124 moves vertically via the valve rod 125, and the steam governing valve 120 performs opening/closing operations. The steam flow rate is controlled by the opening/closing operations, and steam flows into an unshown steam turbine. Note that, a piston 126 and a closing spring 129 are fitted into the oil cylinder 127 of the steam governing valve 120, and an oil supply and discharge port 128 is arranged underneath the piston 126. A hydraulic device such as a servo valve or a dump valve is connected to the oil supply and discharge port 128, although an illustration thereof is omitted from FIG. 14.

Meanwhile, the main stop valve 110 is configured similarly to the steam governing valve 120, and has a top cover 112 on an upper end portion of the valve main body 111. A valve seat 114 forming a raised shape is provided in an internal portion of a valve main body 111, and a valve element 115 that butts against the valve seat 114 is connected to an oil cylinder 117 through a valve rod 116. When hydraulic pressure acts on the oil cylinder 117, the valve element 115 moves vertically via the valve rod 116, and the main stop valve 110 performs opening/closing operations. Supply of steam and cutting off of the supply of steam are executed by way of the opening/closing operations. Note that, reference numeral 113 in FIG. 14 denotes a strainer.

Generally, in a steam governing valve apparatus that is used in a steam turbine of a power generation facility, in particular in the steam governing valve 120, unsuitable cases such as the occurrence of noise, vibrations, erosion and material deterioration are known. The steam governing valve 120 is configured so as to control the steam flow rate by way of a throttling function between the valve element 124 and the valve seat 123, that is achieved by moving the valve element 124 in the valve chest that comprises the valve element 124 and the valve seat 123. It is considered that the aforementioned noise or vibrations arise because the noise or vibrations are induced by turbulence in the flow of steam around the valve element 124 or an unstable flow or the like (for example, see Patent Document 1).

Recently, accompanying increases in steam conditions at power generation facilities (supercritical pressure plants) and increases in the single unit capacity of steam turbines, improved technology that incorporates further enhancements is being proposed (for example, see Patent Documents 2 and 3).

As shown in FIG. 15 and FIG. 16, a steam governing valve 120 in the aforementioned Patent Documents 1 and 2 comprises a valve element 124 that is formed with a spherical curved surface and has a recessed portion 130 comprising an edge 131 at a rim, and a valve seat 123 that has a spherical curved surface so as to gradually expand towards a downstream side from a position that the valve element 124 contacts, and is configured so that the spherical curved surfaces of the valve element 124 and the valve seat 123 contact each other. Accordingly, in the steam governing valve 120, on a bottom portion side of the valve element 124, because the recessed portion 130 having the edge 131 at the rim is provided, from in a range from a minute opening degree to the vicinity of an intermediate opening degree as shown in FIG. 17(A), a flow of steam along the valve element 124 is separated at the edge 131 of the valve element 124 and becomes a stable flow along the valve seat 123, and thus the generation of noise or vibrations can be prevented.

Further, in a steam governing valve described in Patent Document 3, a flow guide is provided inside a recessed portion of a valve element, and the flow guide is mounted on the valve main body side.

PRIOR ART DOCUMENTS

Patent Documents

Patent Document 1: Japanese Patent Laid-Open No. 56-109955
Patent Document 2: Japanese Patent Laid-Open No. 2006-63957
Patent Document 3: Japanese Patent Laid-Open No. 2008-175267

SUMMARY OF THE INVENTION

Problems to be Solved by the Invention

However, the valve element 124 of the steam governing valve 120 in Patent Documents 1 and 2 is a shape that has the recessed portion 130 that includes the edge 131 at the rim, and although the configuration is effective for preventing noise and vibration that is the original function thereof in a range from the start of opening of the valve element 124 to the vicinity of an intermediate opening degree, in a high valve opening degree state such as when the valve is in a fully-open opening degree state or in the vicinity thereof as shown in FIG. 17(B), the area immediately below the valve element 124 becomes a dead space, and as shown in by arrows in FIG. 17(B), vortices 132 arise inside the dead space and a pressure loss occurs.

In this connection, with respect to recent steam turbines, there is a strong demand for performance improvement (efficiency improvement) as a market demand of proprietors of power generation businesses. In terms of a breakdown of the efficiency of a steam turbine, although improving the internal efficiency of the steam turbine itself is important, decreasing the above described pressure loss in the steam governing valve 120 that is mounted at an inlet of the steam turbine is also extremely important. That is, when a pressure loss arises in the steam governing valve 120 or the like, it means that the steam pressure at the steam turbine inlet is reduced before doing thermodynamically effective work, and consequently the pressure loss has a significant affect (efficiency reduction) on the efficiency of the steam turbine. Therefore, a pending problem for many years with respect to the steam governing valve 120 is to what extent it is possible to reduce a pressure loss in a fully-open opening degree state.

Although the steam governing valve described in Patent Document 3 resolves the problem of the dead space directly below the valve element in the high valve opening degree state by way of a flow guide and suppresses the occurrence of the vortices 132 to thereby reduce pressure loss, because the flow guide is a separate member from the valve element, the component count increases and consequently the apparatus structure is liable to becomes complicated.

An object of an embodiment of the present invention is to provide a steam governing valve apparatus that is made in consideration of the above described circumstances and that, with a simple structure in which the component count is reduced, can prevent the occurrence of noise and vibrations in a range from a minute opening degree to the vicinity of an intermediate opening degree and can reduce a pressure loss when the opening degree is a fully-open opening degree or the vicinity thereof and thus improve the efficiency of a steam turbine, as well as a power generation facility that comprises the steam governing valve apparatus.

Means for Solving the Problems

A steam governing valve apparatus according to an embodiment of the present invention comprises: a valve main body in which a valve chest is formed to which steam is supplied; a valve seat in which a spherical curved surface is formed at a position facing the valve chest that is provided in the valve main body; a valve element that is housed in the valve chest and on which a spherical curved surface is formed; and a valve rod that is provided on an upstream side relative to the valve element and that drives so that the respective spherical curved surfaces of the valve seat and the valve element contact/separate to set a valve opening degree; wherein a bottom portion of the valve element has a protruding portion that protrudes from a middle position thereof to the valve seat side, and an edge that is formed at a rim so that a recessed portion is formed around the protruding portion.

Further, a power generation facility according to an embodiment of the present invention comprises the steam governing valve apparatus according to an embodiment of the present invention.

According to the embodiments described in the foregoing, with a simple structure in which the component count is reduced, the occurrence of noise and vibrations can be prevented in a range from a minute opening degree to the vicinity of an intermediate opening degree, and a pressure loss can be decreased at a fully-open opening degree or the vicinity thereof to thereby improve the efficiency of a steam turbine.

BRIEF DESCRIPTION OF THE DRAWINGS

FIG. 6 is an explanatory drawing for determining a flow channel area of a steam path portion in the fully-open opening degree state illustrated in FIG. 4.

DESCRIPTION OF EMBODIMENTS

Hereunder, modes for carrying out the present invention are described based on the drawings.

Figure 1:
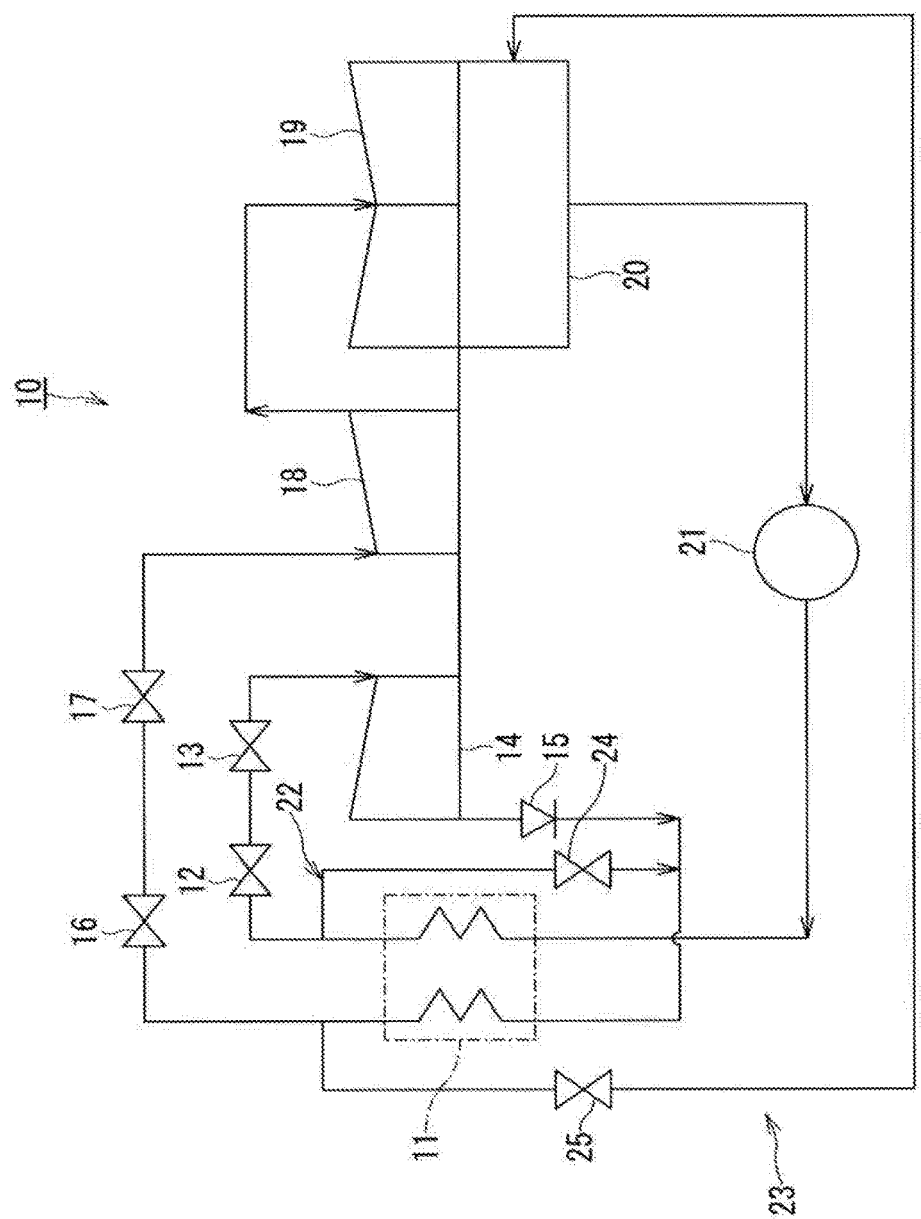
FIG. 1 is a system diagram illustrating a power generation facility equipped with a steam governing valve that is a steam governing valve apparatus according to the present embodiment.
Figure 2:
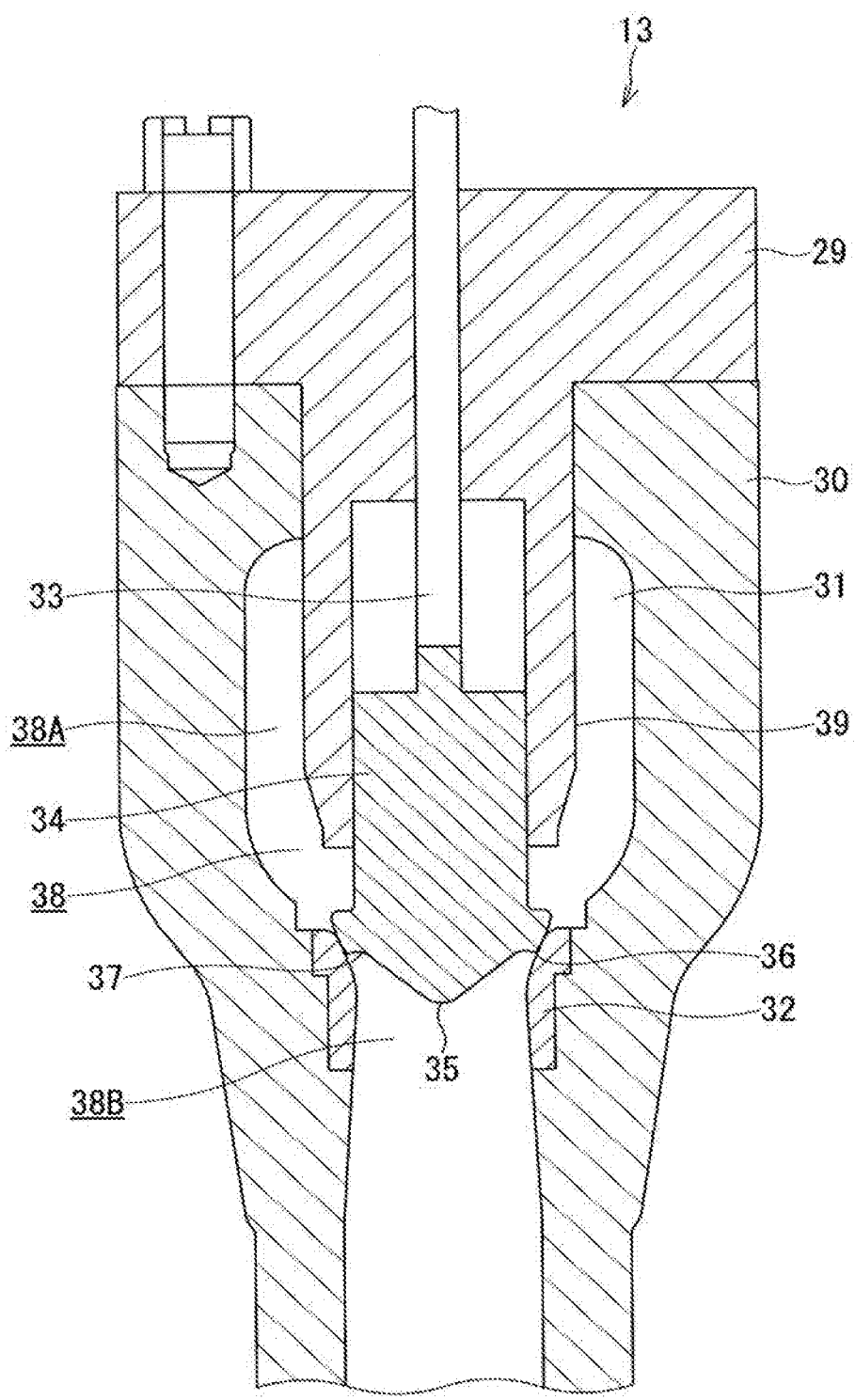
FIG. 2 is a cross-sectional view illustrating a fully-closed opening degree state in the steam governing valve illustrated in FIG. 1.
Figure 3:
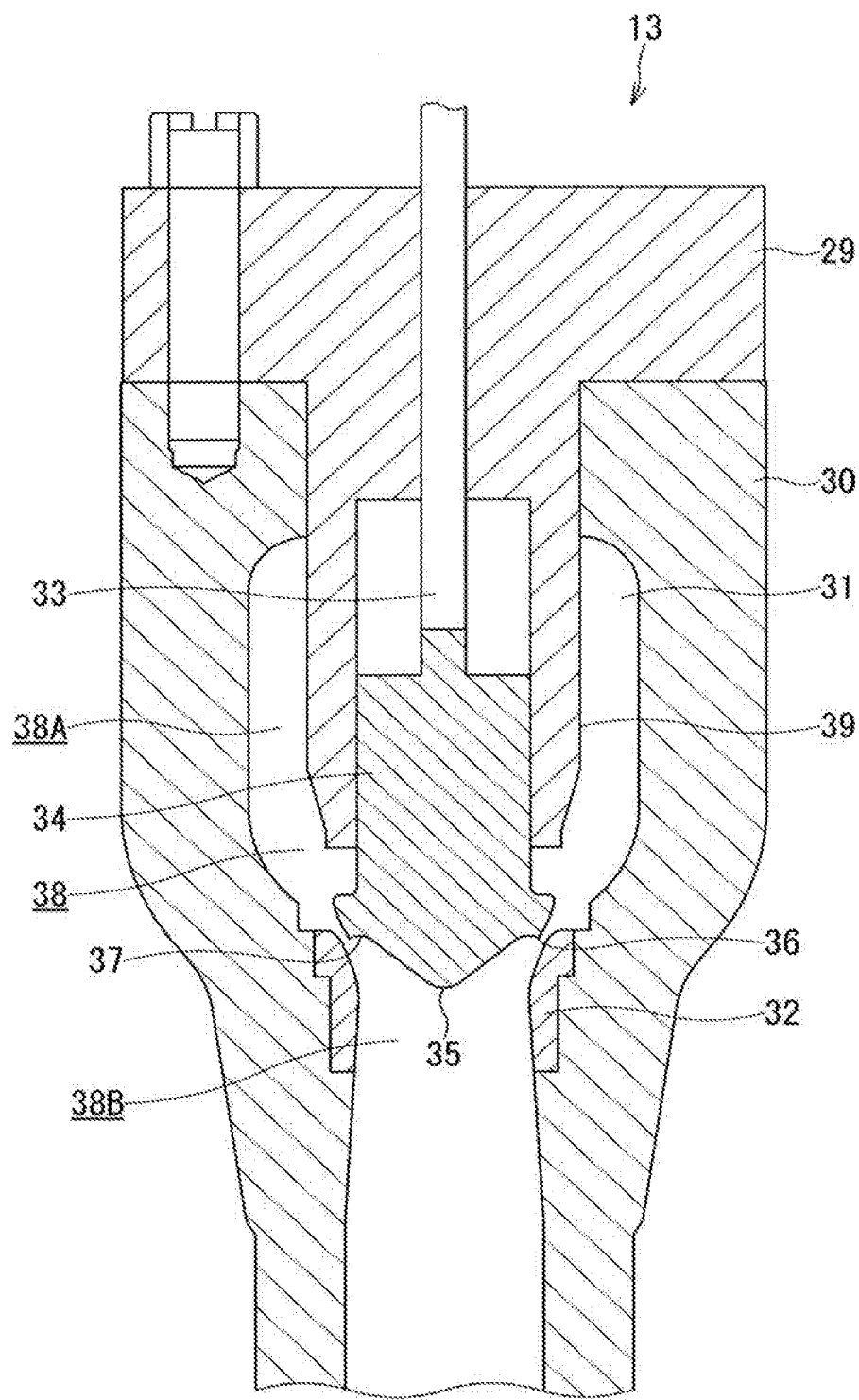
FIG. 3 is a cross-sectional view illustrating a minute opening degree state in the steam governing valve illustrated in FIG. 1.
Figure 4:
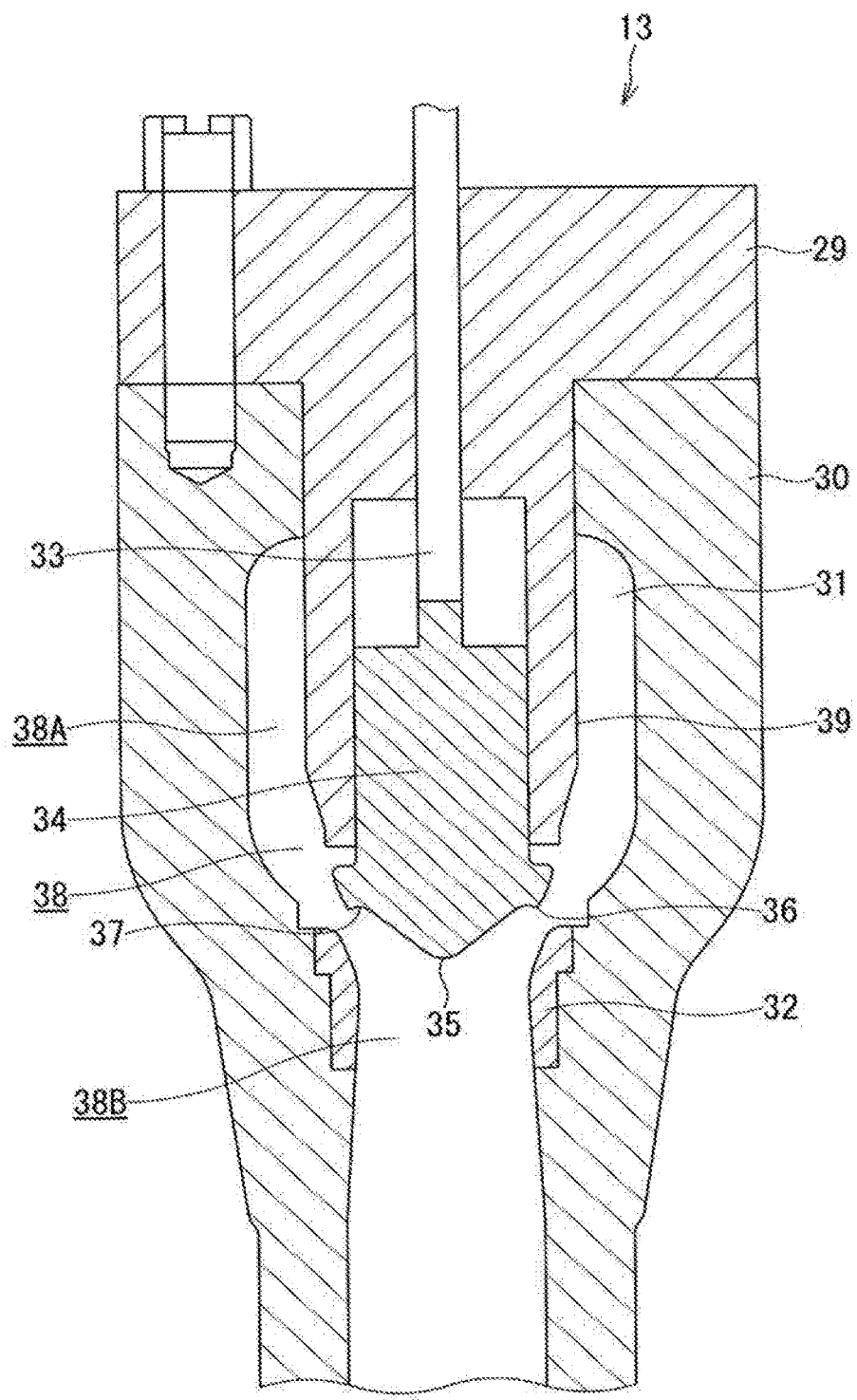
FIG. 4 is a cross-sectional view illustrating a fully-open opening degree state in the steam governing valve illustrated in FIG. 1.

FIG. 1 is a system diagram illustrating a power generation facility that is equipped with a steam governing valve as a steam governing valve apparatus according to the present embodiment. FIG. 2, FIG. 3 and FIG. 4 are cross-sectional views that illustrate a fully-closed opening degree state, a minute opening degree state, and a fully-open opening degree state, respectively, in the steam governing valve shown in FIG. 1.

In a power generation facility 10 shown in FIG. 1, steam from a boiler 11 passes through a main stop valve 12 and a steam governing valve 13 to reach a high-pressure turbine 14 where the steam expands and performs work, and thereafter the steam is once more heated in a reheater of the boiler 11 via a check valve 15, and subsequently flows through a reheat stop valve 16 and an intercept valve 17 and flows in sequence into an intermediate-pressure turbine 18 and a low-pressure turbine 19 and expands and performs work. After performing work in the low-pressure turbine 19, the steam is returned to water at a steam condenser 20, and then pressurized by a feedwater pump 21 and supplied again to the boiler 11 to be circulated.

Further, in order to raise the operating efficiency of the power generation facility 10, depending on the power generation facility 10, a high-pressure turbine bypass pipe 22 and a low-pressure turbine bypass pipe 23 are installed so that the boiler 11 can be operated regardless of the operational state of the turbines 14, 18 and 19. The high-pressure turbine bypass pipe 22 branches from an outlet side of the boiler 11 and is connected to an inlet side of the reheater of boiler 11, and includes a high-pressure turbine bypass valve 24. The low-pressure turbine bypass pipe 23 branches from an outlet side of the reheater of the boiler 11 and is connected to the inlet side of the steam condenser 20, and includes a low-pressure turbine bypass valve 25.

As shown in FIG. 2 to FIG. 4, the steam governing valve 13 as a steam governing valve apparatus that is mounted in the aforementioned power generation facility 10 comprises a valve main body 30 in which a valve chest 31 to which steam is supplied is formed, a valve seat 32 in which a spherical curved surface is formed at a position facing the valve chest 31 that is provided in the valve main body 30; a valve element 34 that is housed in the valve chest 31 and on which a spherical curved surface is formed; and a valve rod 33 that is provided on an upstream side relative to the valve element 34 and that drives so that the respective spherical curved surfaces of the valve seat 32 and the valve element 34 contact/separate to set a valve opening degree. A bottom portion of the valve element 34 has a protruding portion 35 that protrudes from a middle position thereof to the valve seat 32 side, and an edge 36 that is formed at a rim so that a recessed portion 37 is formed around the protruding portion 35. In a state in which the valve opening degree is set to be fully open (hereunder, referred to as "fully-open opening degree") or a state in which the valve opening degree is in the vicinity of the fully-open opening degree, a steam path portion 38 is formed by an inner face of the valve main body 30, the valve seat 32, the valve element 34 and a guide cylinder 39 that is described later.

That is, a top cover 29 is provided at an upper end portion of the valve main body 30, and the valve seat 32 is provided inside the valve main body 30. The valve rod 33 is coupled to the valve element 34 that contacts the valve seat 32, and the valve rod 33 penetrates through the top cover 29 and is connected to an unshown oil cylinder. When hydraulic pressure acts on the oil cylinder, the valve element 34 moves in the vertical direction in FIG. 2 to FIG. 4 through the valve rod 33. The guide cylinder 39 that guides the vertical motion of the valve element 34 is formed in the top cover 29, and the valve element 34 moves in the vertical direction inside the guide cylinder 39. Note that, although bushing is built into a penetrating portion of the valve rod 33 in the top cover 29 since it serves as a sliding surface of the valve rod 33, illustration thereof is omitted in the present embodiment.

Figure 5B:
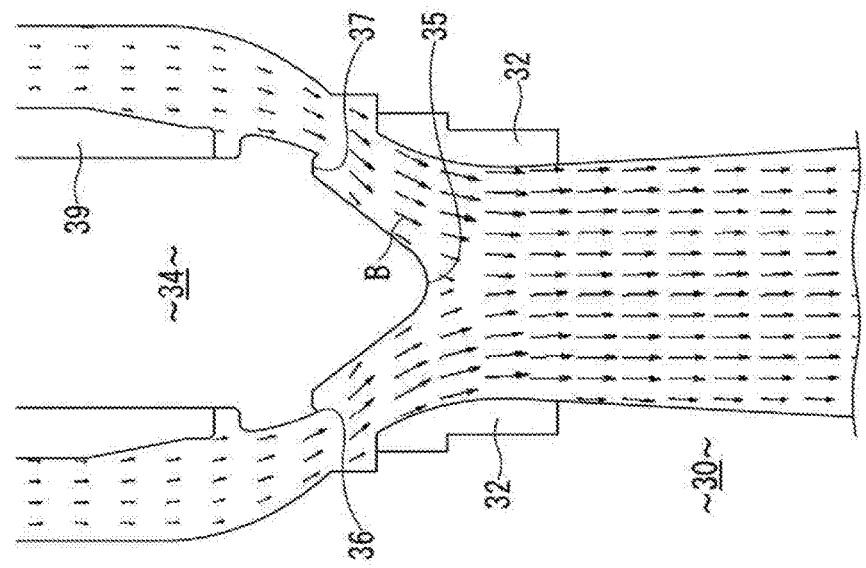
FIG. 5 is a multiple view drawing in which (A) is an explanatory drawing for describing a flow state of steam when the steam governing valve illustrated in FIG. 2 to FIG. 4 is in a minute opening degree state, and (B) is an explanatory drawing for describing a flow state of steam when the steam governing valve illustrated in FIG. 2 to FIG. 4 is in a fully-open opening degree state.
Figure 5A:
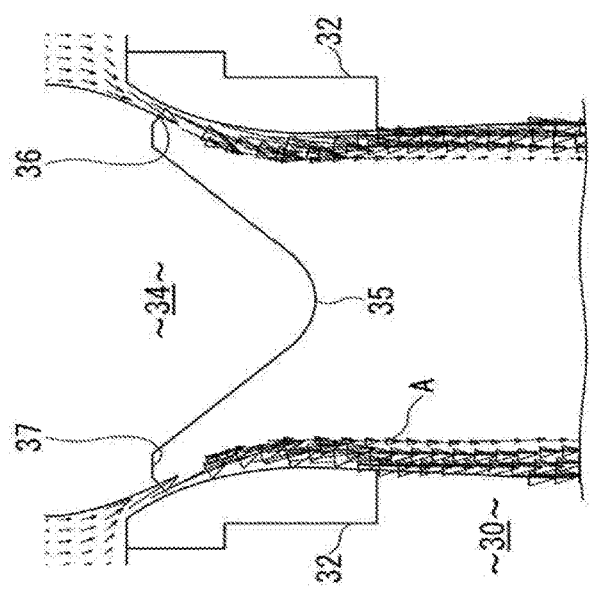

Because the recessed portion 37 that includes the edge 36 at the rim is provided in the bottom portion of the valve element 34, as shown in FIG. 5 (A), in the state of a minute opening degree of the steam governing valve 13, a flow of steam along the valve element 34 is separated by the edge 36 of the valve element 34 and becomes a stable flow along the valve seat 32, and hence the occurrence of noise or vibrations is prevented. As shown by an arrow A in FIG. 5(A), since, as described above, the flow of steam at such time is an adhering flow along an inner circumferential face of the valve seat 32, a flow is not present along the protruding portion 35 of the valve element 34.

As shown in FIG. 2 to FIG. 4, the protruding portion 35 that is provided at a middle position of the bottom portion of the valve element 34 is formed integrally with the valve element 34. In the protruding portion 35, a center portion protrudes in a convex shape towards the downstream valve seat 32 side, and the protruding portion 35 is defined by a diameter Da of a root portion and an angle THa that are set as described later. In addition, a distalmost end of the protruding portion 35 is formed in a substantially hemispherical shape in consideration of safety during assembly and the like.

The flow channel area of the steam path portion 38 when the opening degree is the fully-open opening degree or the vicinity thereof is somewhat larger at an annular portion 38A on an upstream side relative to the valve seat 32 in comparison to a circular portion 38B on the downstream valve seat 32 side, and furthermore, as described above, because a swirling flow at a bottom portion of the valve element 34 is eliminated as a result of the protruding portion 35 being formed at the bottom portion of the valve element 34, as shown by arrows B in FIG. 5(B), it is easy for steam to flow when the opening degree is the fully-open opening degree or the vicinity thereof.

As described above, when the opening degree is the fully-open opening degree or the vicinity thereof, the steam path portion 38 is formed by the inner face of the valve main body 30, the valve seat 32, the valve element 34 and the guide cylinder 39. The flow channel area of the steam path portion 38 is configured so as to gradually decrease from the annular portion 38A on the upstream side that is defined by the inner circumferential face of the valve main body 30 and the guide cylinder 39 towards the circular portion 38B on the downstream side that is defined by the valve seat 32, and to smoothly change in a continuous manner without any extreme changes until ultimately arriving at an opening area of the valve seat 32 (area that is defined by the inner diameter of the valve seat 32). Thereby, when the opening degree is the fully-open opening degree or the vicinity thereof, as shown by the arrows B in FIG. 5(B), since steam flowing through this steam path portion 38 flows smoothly without generating a vortex in the vicinity of the bottom portion of the valve element 34, a pressure loss is suppressed.

More specifically, the flow channel area of the steam path portion 38 is configured to gradually decrease from the upstream guide cylinder 39 and the inner circumferential face side of the valve main body 30 towards the downstream valve seat 32 side, and is set so as to be smallest at a portion constituted by the valve element 34 and the valve seat 32, and thereafter, while marginally increasing, the flow channel area ultimately arrives at the area that is defined by the inner diameter of the valve seat 32. The reason the smallest flow channel area exists at the portion constituted by the valve element 34 and the valve seat 32 is that the steam governing valve 13 controls the flow rate of steam at this portion.

Figure 7:
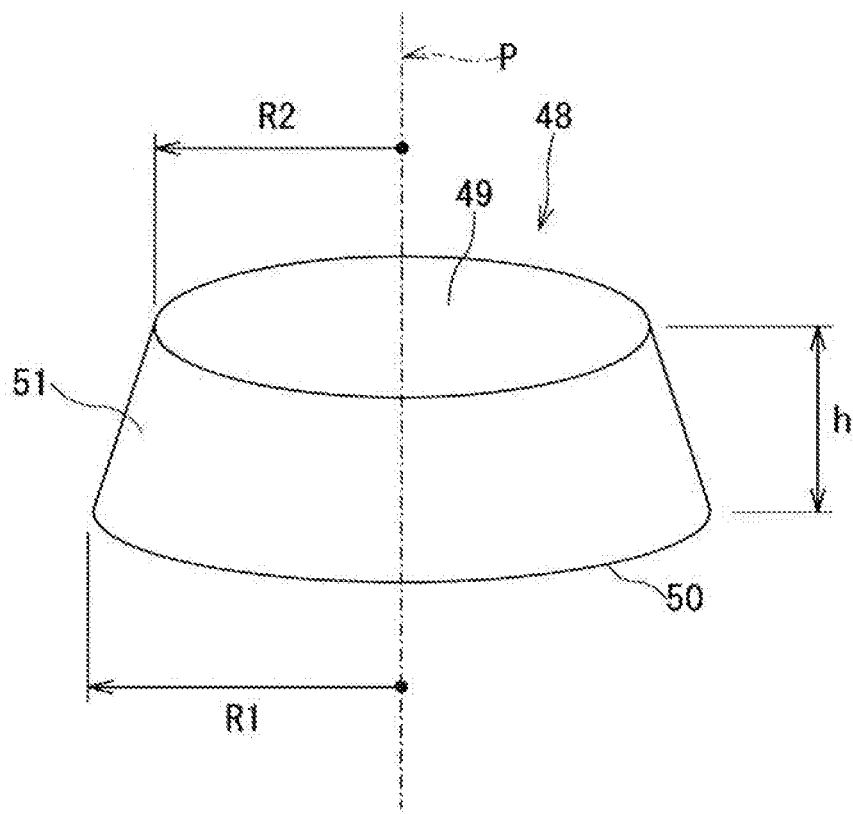
FIG. 7 is an explanatory drawing for determining a flow channel area of a steam path portion in the fully-open opening degree state illustrated in FIG. 4.
Figure 8:
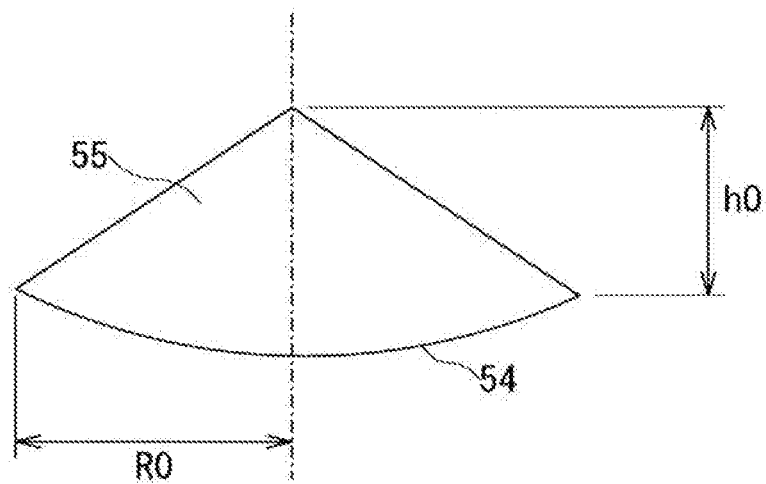
FIG. 8 is an explanatory drawing for determining a flow channel area of a steam path portion in the fully-open opening degree state illustrated in FIG. 4.

A method for determining the flow channel area of the steam path portion 38 (mainly, a portion constituted by the valve element 34 and the valve seat 32) in a fully-open opening degree state will now be described using FIG. 6 to FIG. 8.

First, a flow channel area of an inlet portion 42 of the steam path portion 38 (mainly, a portion constituted by the valve element 34 and the valve seat 32) is an annular area constituted by an edge endpoint 40 of the edge 36 of the valve element 34 and an inlet endpoint 41 of the valve seat 32. Further, a flow channel area of an outlet portion 43 of the steam path portion 38 (mainly, the portion constituted by the valve element 34 and the valve seat 32) is a circular area defined by an inner diameter Dth (described later) of the valve seat 32.

Next, a flow channel area partway along the flow path from the inlet portion 42 to the outlet portion 43 of the steam path portion 38 is geometrically determined. A curve 44 that halves the flow channel area from the inlet portion 42 to the outlet portion 43 is determined, a perpendicular line (for example, a perpendicular line 45) with respect to the curve 44 is created, and an intersection point (for example, an intersection point 46) between the perpendicular line and the valve element 34 as well as an intersection point (for example, an intersection point 47) between the perpendicular line and the valve seat 32 are determined. When these intersection points are rotated around a valve center line P, a circular truncated cone (for example, a circular truncated cone 48) is created.

That is, in the steam path portion 38 (mainly, the portion constituted by the valve element 34 and the valve seat 32), it is assumed that there are an innumerable number of the circular truncated cones 48 in succession along the flow direction. An area of a (lateral area) lateral face 51 that excludes an area of an upper bottom face 49 and a lower bottom face 50 of these circular truncated cones 48 (see FIG. 7) is the flow channel area at the positions of the respective circular truncated cones 48 of the steam path portion 38 (mainly, the portion constituted by the valve element 34 and the valve seat 32). When the radius of the lower bottom face 50 in the respective circular truncated cones 48 is taken as R1, the radius of the upper bottom face 49 thereof is taken as R2, and the height thereof is taken as h, the lateral area of each circular truncated cone 48 is given by:

$$\text{lateral area of circular truncated cone} = \pi \times (R1+R2) \times \{h^2+(R1-R2)^2\}^{1/2}$$

Further, a plurality of circular cones 53, and not circular truncated cones, are assumed to be present on the downstream side of the protruding portion 35 of the valve element 34 at the steam path portion 38 (mainly, the portion constituted by the valve element 34 and the valve seat 32). The area (for example, lateral area) of a lateral face 55 of the respective circular cones 53 is the flow channel area at the positions of the respective circular cones 53 of the steam path portion 38. When the radius of a bottom face 54 of the respective circular cones 53 (see FIG. 8) is taken as R0 and the height is taken as h0, the lateral area of each circular cone 53 is determined by the following expression:

$$\text{lateral area of circular cone} = \pi \times R0 \times (h0^2+R0^2)^{1/2}$$

Figure 9:
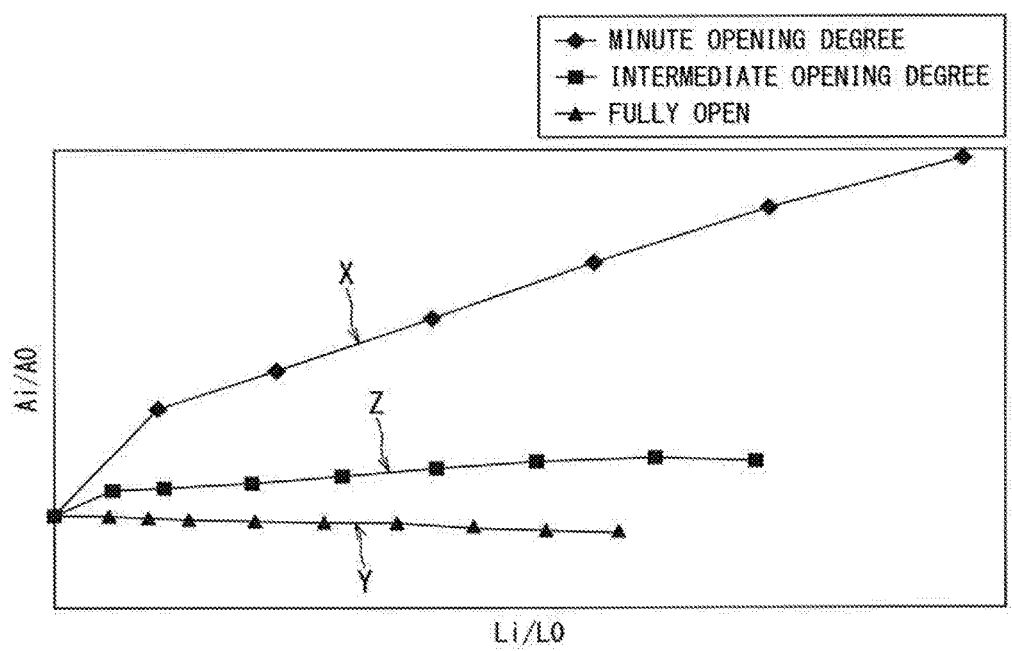
FIG. 9 is a graph illustrating change characteristics with respect to a flow channel area in the steam governing valve illustrated in FIG. 2 to FIG. 4.

A flow channel area at each position of the steam path portion 38 (mainly, the portion constituted by the valve element 34 and the valve seat 32) in the fully-open opening degree state is determined as described above. The relation between change characteristics of the flow channel area of the steam path portion 38 and the valve opening degree is shown in FIG. 9. In FIG. 9, reference character A0 represents an area of the inlet portion 42, and reference character L0 represents a distance between the edge endpoint 40 of the edge 36 of the valve element 34 and the inlet endpoint 41 of the valve seat 32 at the inlet portion 42. Further, reference character Ai represents an area that includes an arbitrary perpendicular line 45 that is downstream relative to the inlet portion, and reference character Li represents a distance between intersection points 46 and 47 on the arbitrary perpendicular line 45.

In FIG. 9, in a curve X that represents changes in the flow channel area at a minute opening degree, an angle of inclination in the right-upward direction is large, and it is found that at such time the flow channel area increases and steam separates after passing the edge 36 of the valve element 34. Further, a curve Y that represents changes in the flow channel area at the fully-open opening degree exhibits an inclination in right-downward direction, and it is found that at such time the flow channel area decreases because the protruding portion 35 is formed in the valve element 34, and steam adheres to the protruding portion 35 once the steam is separated by the edge 36. Further, an angle of inclination of a curve Z that represents changes in the flow channel area at the intermediate opening degree is small, and it is found that the flow channel area at such time is substantially constant, and separation caused by the edge 36 of the valve element 34 does not occur.

The steam path portion 38 (including the portion constituted by the valve element 34 and the valve seat 32) is finally determined with the principal objective of decreasing pressure loss by defining the following parameters Di, Dth, R, r, Da and THa so as to obtain the optimal characteristic as represented by the curve Y in FIG. 9 at the fully-open opening degree.

Figure 10:
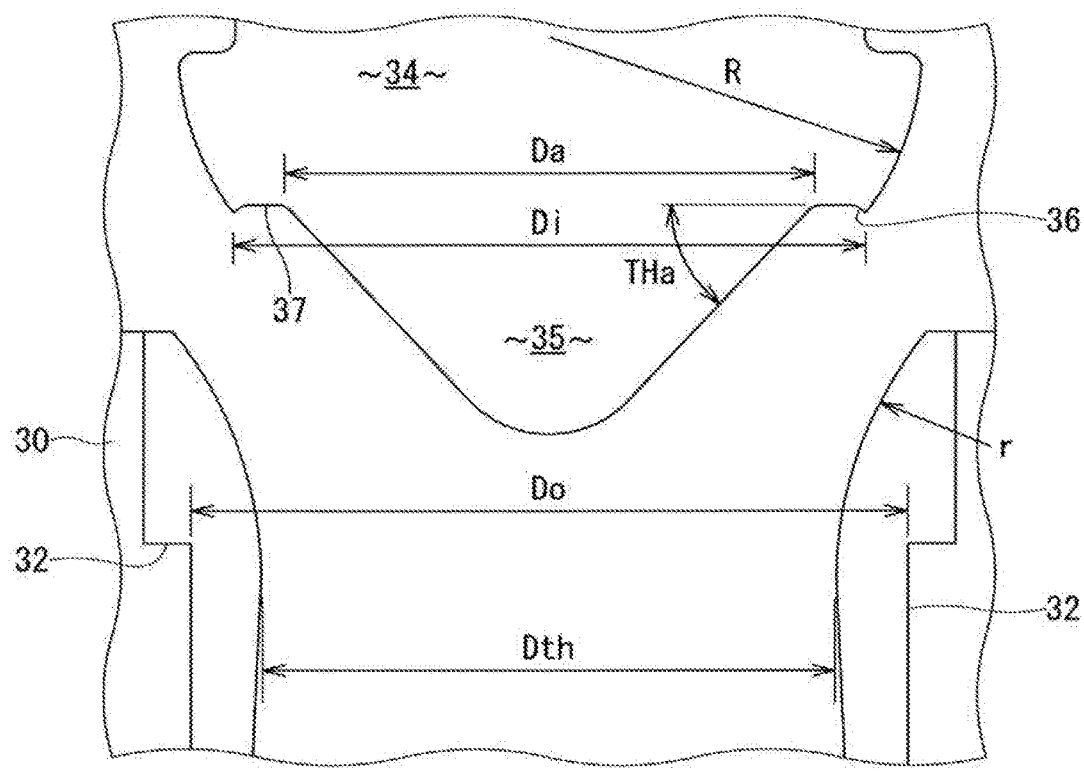
FIG. 10 is a schematic cross-sectional view illustrating dimensions of respective members in the steam governing valve illustrated in FIG. 2 to FIG. 4.

First, as shown in FIG. 10, when a seat diameter that is a diameter of an osculating circle between the valve element 34 and the valve seat 32 is taken as "Do", a diameter Di of the edge 36 in the recessed portion 37 of the valve element 34 is set in a range of:

Do>Di≥0.9 Do, and an inner diameter (smallest inner diameter) Dth of the valve seat 32 is set in a range of:

Di>Dth≥0.8 Do.

Thereby, in a range from a minute opening degree to the vicinity of an intermediate opening degree, steam flowing within the steam path portion 38 forms a stable flow along the valve seat 32 (see arrows in FIG. 5), and the occurrence of noise and vibrations is prevented.

Further, when the seat diameter that is the diameter of an osculating circle between the valve element 34 and the valve seat 32 is taken as "Do", a curvature radius R of the valve element 34 is set in a range of:

R=(0.52 to 0.6) Do, and a curvature radius r of the valve seat 32 is set in a range of:

r≥0.6 Do.

By this also, in a range from a minute opening degree to the vicinity of an intermediate opening degree, steam flowing within the steam path portion 38 forms a stable flow along the valve seat 32, and the occurrence of noise and vibrations is prevented.

In addition, a longitudinal cross-sectional shape of a surface forming the steam path portion 38 in the protruding portion 35 of the valve element 34 is defined by a root diameter Da of the protruding portion 35 and an angle THa of the protruding portion 35. When the seat diameter that is the diameter of an osculating circle between the valve element 34 and the valve seat 32 is taken as "Do", the root diameter Da is set in a range of:

Da=(0.40 to 0.44) Do, and the angle THa of the protruding portion 35 is set to:

THa=30 to 50 deg.

Because the protruding portion 35 is provided in the bottom portion of the valve element 34, no unnecessary space is formed within the valve main body 30, and hence the occurrence of a vortex in the vicinity of the upstream side of the valve seat 32 is suppressed. In addition, by setting the protruding portion 35 within the aforementioned range, the occurrence of a situation in which the pressure loss increases due to steam excessively adhering to the protruding portion 35 and causing an increase in the frictional resistance is prevented.

Figure 11:
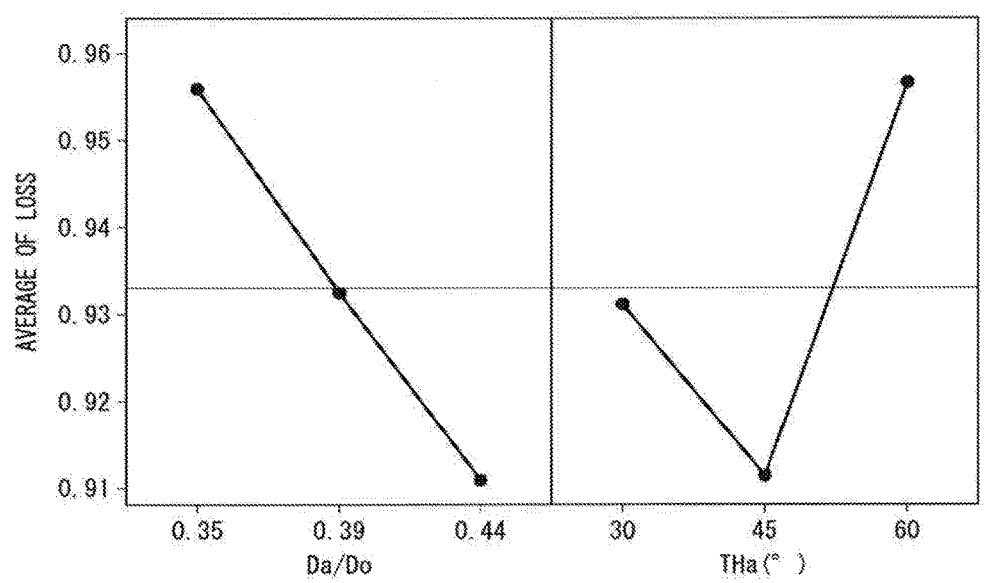
FIG. 11 is a graph illustrating a relation between a root diameter Da and an angle THa of a protruding portion and a pressure loss in the steam governing valve illustrated in FIG. 2 to FIG. 4.

FIG. 11 shows results obtained when the influence of the root diameter Da and angle THa of the protruding portion 35 on pressure loss was investigated using numerical analysis. In FIG. 11, the horizontal axis represents Da/Do and THa, and the vertical axis represents pressure loss. According to the present embodiment, since the root diameter Da of the protruding portion 35 is set to 0.40 Do<Da<0.44 Do, as will also be understood from FIG. 11, the occurrence of pressure loss is reliably suppressed. Further, since the angle THa of the protruding portion 35 is set to 30°<THa<50°, as will also be understood from FIG. 11, the occurrence of pressure loss is reliably suppressed.

Figure 12:
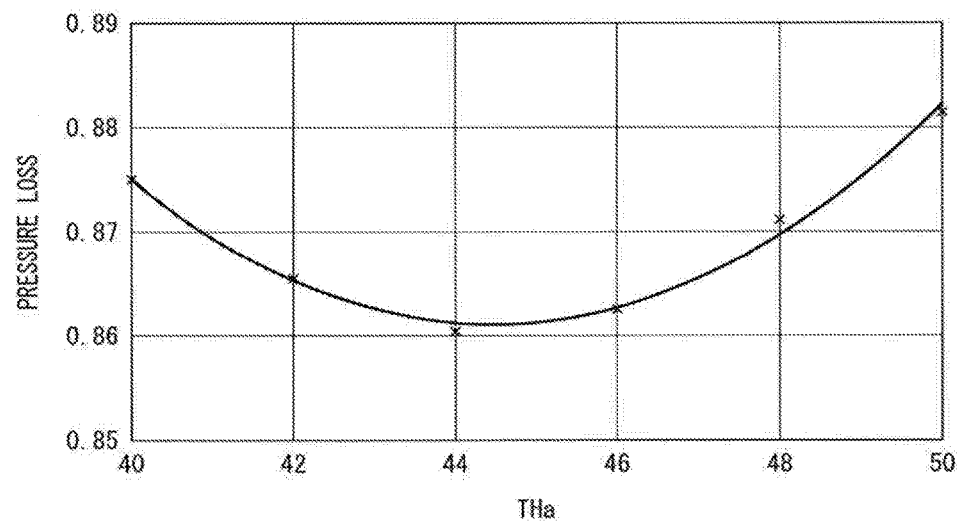
FIG. 12 is a graph illustrating a relation between the angle THa of the protruding portion and a pressure loss in the steam governing valve illustrated in FIG. 2 to FIG. 4.
Figure 13:
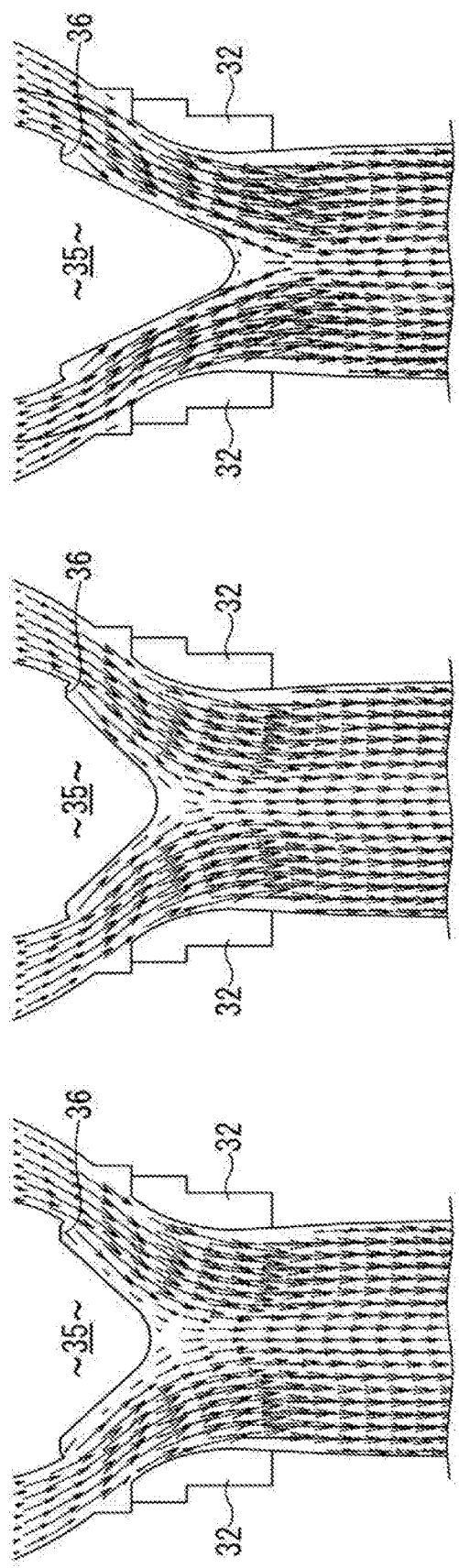
FIG. 13 is a multiple view drawing in which (A) is an explanatory drawing illustrating a flow state of steam when the angle of the protruding portion is THa=40° in the steam governing valve illustrated in FIG. 2 to FIG. 4, (B) is an explanatory drawing illustrating a flow state of steam when the angle THa=44°, and (C) is an explanatory drawing illustrating a flow state of steam when the angle THa=60°.
Figure 14:
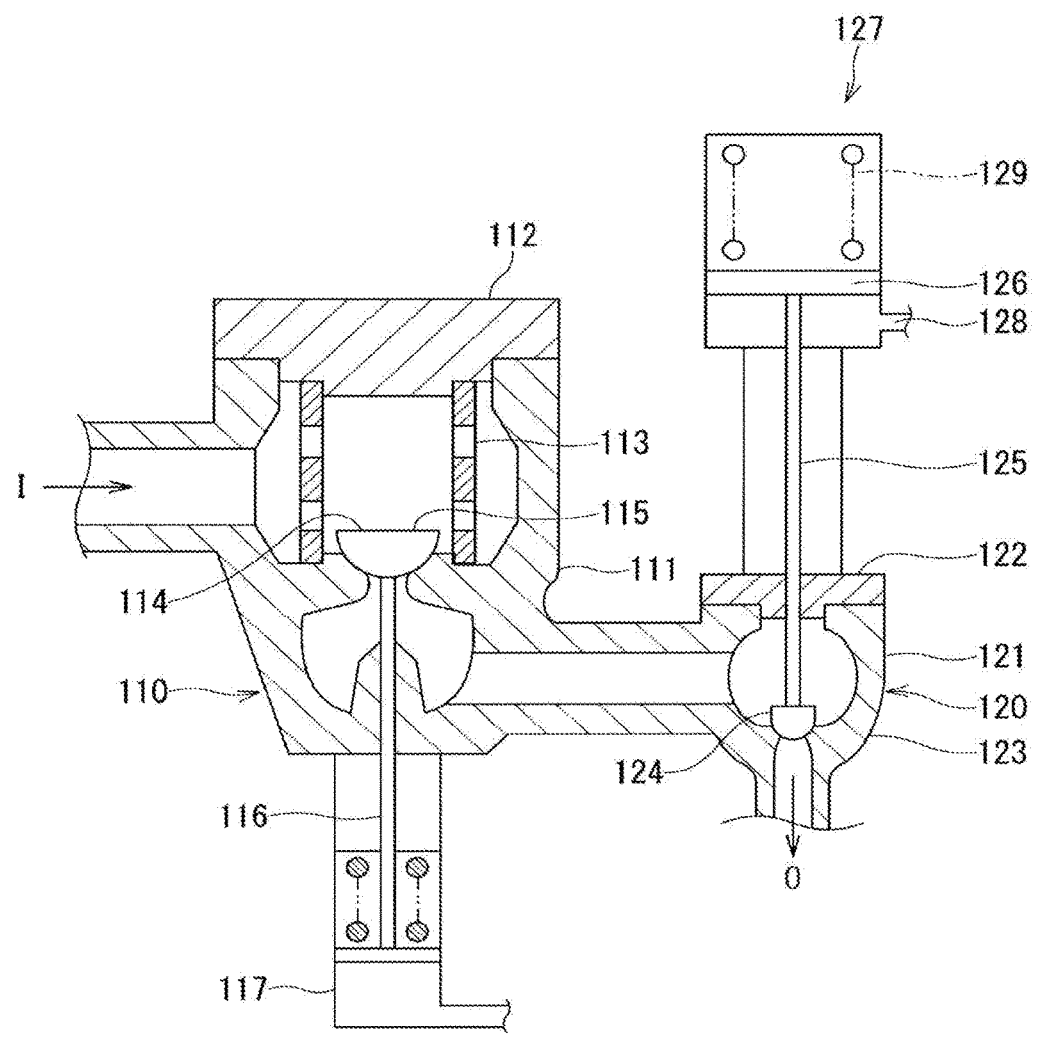
FIG. 14 is a cross-sectional view illustrating a conventional steam governing valve apparatus.
Figure 15:
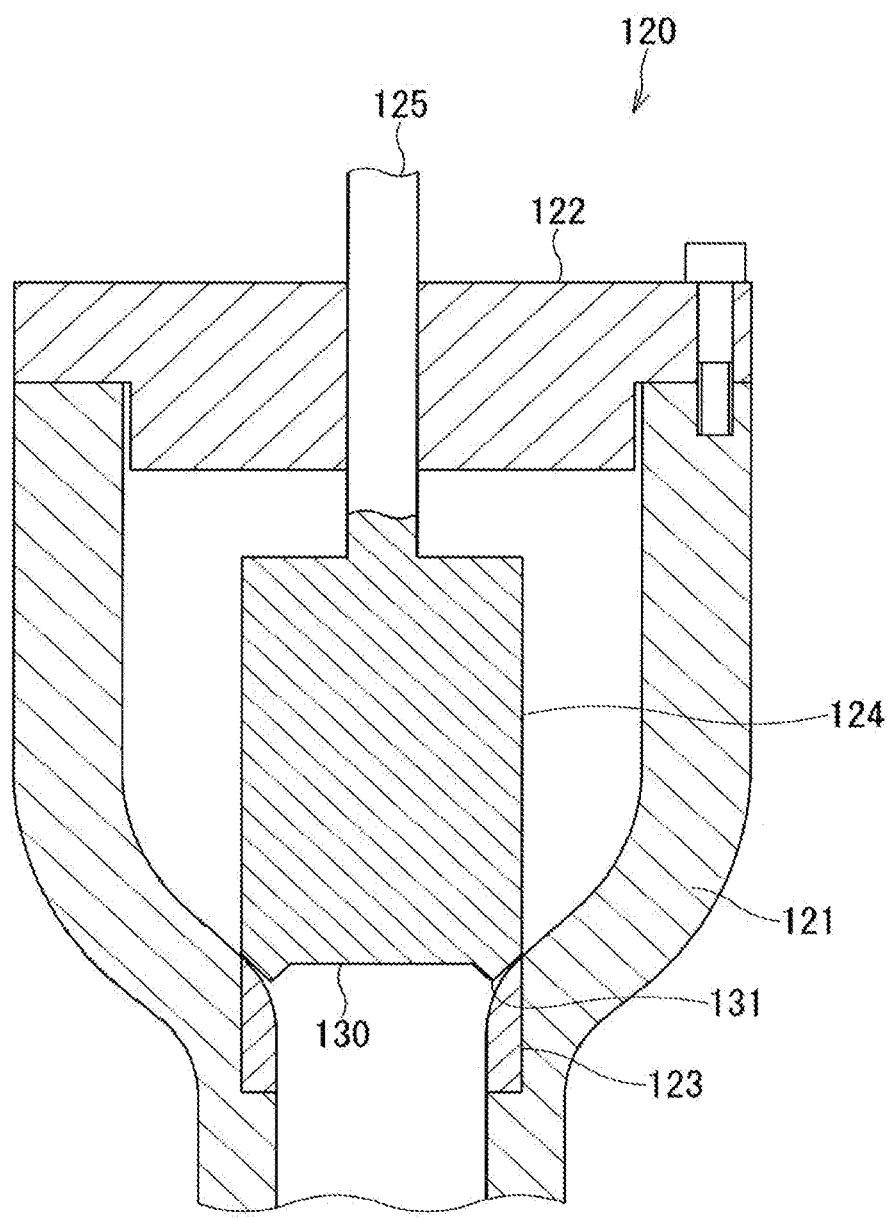
FIG. 15 is a cross-sectional view illustrating a fully-closed opening degree state in the steam governing valve shown in FIG. 14.
Figure 16:
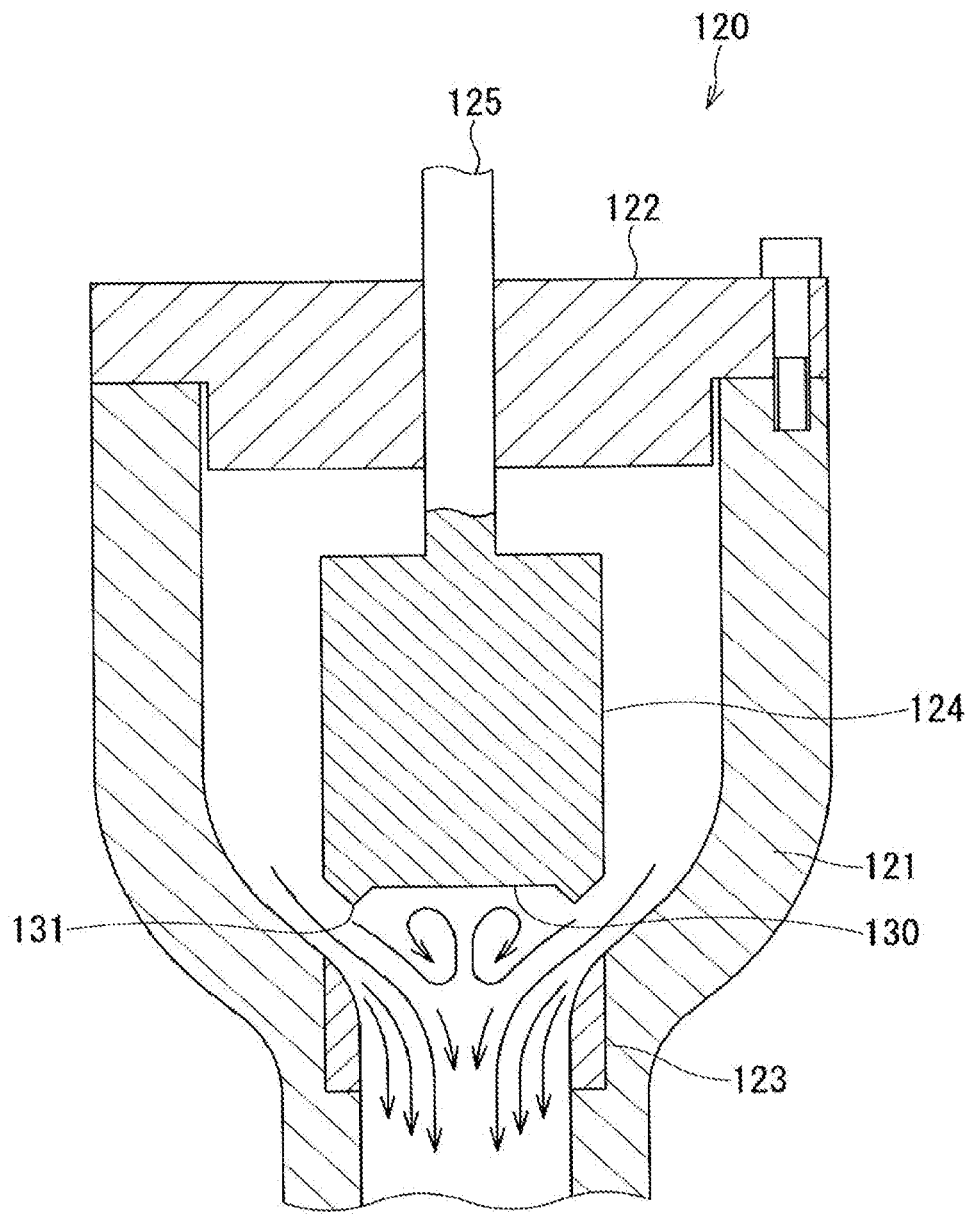
FIG. 16 is a cross-sectional view illustrating a fully-open opening degree state in the steam governing valve shown in FIG. 14.
Figure 17B:
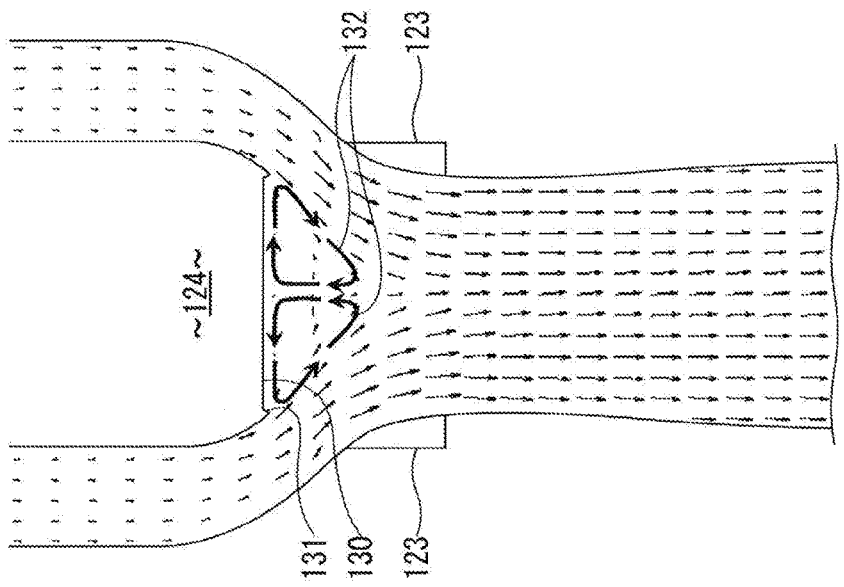
FIG. 17 is a multiple view drawing in which (A) is an explanatory drawing of a flow state of steam when the steam governing valve illustrated in FIG. 14 is in a minute opening degree state, and (B) is an explanatory drawing of a flow state of steam when the steam governing valve illustrated in FIG. 14 is in a fully-open opening degree state.
Figure 17A:
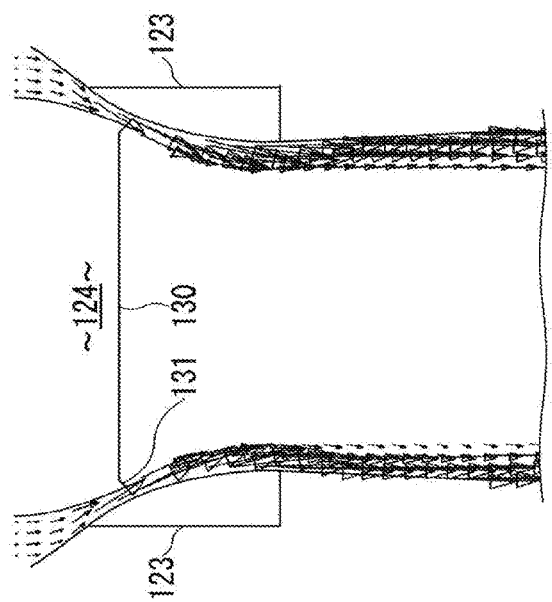

To examine in detail the influence of the angle THa of the protruding portion 35A, numerical analysis was performed in a fully-open opening degree state in which Da was fixed to the value 0.44 Do. The results are shown in FIG. 12. Vector diagrams of the flow of steam were created to visually grasp the influence of the angle THa. With respect to these vector diagrams, a state in which THa=40° is shown in FIG. 13(A), a state in which THa=44° is shown in FIG. 13(B), and a state in which THa=60° is shown in FIG. 13(C). In FIG. 13(A), the flow of steam does not adhere sufficiently to the protruding portion 35 of the bottom portion of the valve element 34. In FIG. 13(C), the flow is such that steam excessively adheres to the protruding portion 35 and consequently pressure loss increases. The state in which pressure loss is smallest is the state illustrated in FIG. 13(B), in which the flow of steam is such that the steam adheres at just the right amount to the protruding portion 35.

Because the present embodiment is configured as described above, the following advantageous effects (1) to (4) are obtained according to the present embodiment.

(1) As shown in FIG. 2 to FIG. 4, because the recessed portion 37 comprising the edge 36 at the rim is provided around the protruding portion 35 of the bottom portion of the valve element 34, in a range from a minute opening degree to the vicinity of an intermediate opening degree, a flow of steam along the valve element 34 is separated at the edge 36 of the valve element 34, and the flow becomes a stable flow along the valve seat 32, and hence the occurrence of noise and vibrations can be prevented.

(2) Because the protruding portion 35 is provided at a middle position of the bottom portion of the valve element 34, changes in the flow channel area in the vicinity of the valve element 34 in the steam path portion 38 when the opening degree is the fully-open opening degree or the vicinity thereof become small. Consequently, a flow of steam that flows through the steam path portion 38 does not generate a vortex in the vicinity of the bottom portion of the valve element 34, and accordingly a pressure loss is suppressed, and thus the efficiency of a steam turbine can be improved.

(3) The protruding portion 35 is provided at a middle position of the bottom portion of the valve element 34, and the recessed portion 37 comprising the edge 36 at the rim is provided around the protruding portion 35 of the bottom portion of the valve element 34. Therefore, in comparison to a case where the protruding portion 35 and the recessed portion 37 are constituted by separate members, the steam governing valve 13 can be constituted by a simple structure in which the component count is reduced.

(4) For example, with regard to steam turbines in combined-cycle power generation facilities, there are many cases in which operation is performed with the steam governing valve 13 always in a fully-open opening degree state. Meanwhile, according to the steam governing valve 13 of the present embodiment, as described in the foregoing (2), the efficiency of a steam turbine can be improved when the opening degree is the fully-open opening degree or the vicinity thereof. Therefore, by using the steam governing valve 13 of the present embodiment in a high-efficiency power generation facility such as a combined-cycle power generation facility, the efficiency of the overall power generation facility can be improved.

Although an embodiment of the present invention has been described above, the present embodiment has been presented by way of example only, and is not intended to limit the scope of the invention. Indeed, this embodiment may be embodied in a variety of other forms; furthermore, various omissions, substitutions and changes may be made without departing from the gist of the invention, and such substitutions and changes are included within the scope and gist of the invention, and are also included in the scope of the invention described in the accompanying claims and their equivalents.

The invention claimed is:

1. A steam governing valve apparatus comprising:
   a valve main body in which a valve chest to which steam is supplied is formed;
   a valve seat in which a spherical curved surface is formed at a position facing the valve chest that is provided in the valve main body;
   a valve element that is housed in the valve chest and on which a spherical curved surface is formed; and
   a valve rod that is provided on an upstream side relative to the valve element and that drives so that the respective spherical curved surfaces of the valve seat and the valve element contact/separate to set a valve opening degree, wherein
   a bottom portion of the valve element has a protruding portion that protrudes from a middle position thereof to a valve seat side and an edge that is formed at a rim so that a recessed portion is formed around the protruding portion, and when a seat diameter between the valve element and the valve seat is taken as "Do", a root diameter Da of the protruding portion of the valve element is set in a range of:

Da=(0.40 to 0.44) Do, and an angle THa of the protruding portion is set in a range of: THa=30 to 50 deg.

2. The steam governing valve apparatus according to claim 1, wherein the protruding portion is formed integrally with the valve element.

3. The steam governing valve apparatus according to claim 1, wherein in a steam path portion that is formed by the valve main body, the valve seat and the valve element in a state in which the valve opening degree is set to fully open, a flow channel area continuously decreases from an upstream side until arriving at an opening of the valve seat on a downstream side.

4. The steam governing valve apparatus according to claim 1, wherein in a steam path portion that is formed by the valve main body, the valve seat and the valve element in a state in which the valve opening degree is set to fully open, a smallest flow channel area exists at a portion that is formed by the valve element and the valve seat.

5. The steam governing valve apparatus according to claim 1, wherein a longitudinal cross-sectional shape of a surface forming a steam path portion of the protruding portion is defined based on a diameter of a root portion and an angle.

6. The steam governing valve apparatus according to claim 1, wherein, in the protruding portion, a center portion protrudes in a convex shape towards a downstream valve seat side, and a distalmost end is formed in a substantially hemispherical shape.

7. The steam governing valve apparatus according to claim 1, wherein a diameter Di of an edge of the valve element is set in a range of:

Do>Di≥0.9 Do, and an inner diameter Dth of the valve seat is set in a range of:

Di>Dth≥0.8 Do.

8. The steam governing valve apparatus according to claim 1, wherein a curvature radius R of the valve element is set in a range of:

R=(0.52 to 0.6) Do, and a curvature radius r of the valve seat is set in a range of:

r≥0.6 Do.

9. A power generation facility that comprises the steam governing valve apparatus according to claim 1.

* * * * *